United States Patent [19]

Nakayama et al.

[11] 4,352,902

[45] Oct. 5, 1982

[54] EMULSION COMPOSITION CONTAINING CELLULOSE DERIVATIVE

[75] Inventors: Yasuharu Nakayama; Hiroshi Iwai; Hajime Sukejima, all of Hiratsuka, Japan

[73] Assignee: Kansai Paint Co., Ltd., Hyogo, Japan

[21] Appl. No.: 223,148

[22] Filed: Jan. 7, 1981

[30] Foreign Application Priority Data

Jan. 8, 1980 [JP] Japan .................................. 55-321
Feb. 1, 1980 [JP] Japan ................................ 55-10015

[51] Int. Cl.$^3$ .............................................. C08L 1/10
[52] U.S. Cl. ...................................... 524/40; 524/36; 524/458; 524/460; 524/461
[58] Field of Search ............. 260/17 A, 17 R; 524/36, 524/40, 458, 460, 461

[56] References Cited

U.S. PATENT DOCUMENTS

| | | | |
|---|---|---|---|
| 3,565,884 | 4/1972 | Okaya et al. | 260/17 A |
| 3,714,105 | 1/1973 | Stehle et al. | 260/17 A |
| 3,953,386 | 4/1976 | Murphy et al. | 526/319 |
| 4,115,306 | 9/1978 | Lindemann | 260/17 A |
| 4,284,740 | 8/1981 | Chang | 260/17 A |

Primary Examiner—Melvyn I. Marquis
Attorney, Agent, or Firm—Wenderoth, Lind & Ponack

[57] ABSTRACT

An emulsion composition which is the product of emulsion polymerization of a mixture of at least one radical-polymerizable unsaturated monomer and at least one cellulose derivative in the presence of a water-soluble resin having a graft-polymerizable unsaturated group in the side chain.

23 Claims, No Drawings

EMULSION COMPOSITION CONTAINING CELLULOSE DERIVATIVE

This invention relates to an emulsion composition containing a cellulose derivative. More specifically, it relates to an emulsion composition containing a cellulose derivative which when formulated into a coating composition and coated on a substrate, can give a coated film which has a tack-free surface of good feel and exhibits excellent gloss, water resistance, yellowing resistance, gasoline resistance and polishability.

In recent years, aqueous emulsion compositions have come into use as resource-saving anti-polluting paints superseding oily paints in fields where the oily paints have previously been used. An emulsion composition obtained by using a conventional ionic or nonionic low molecular or high molecular surface-active agent as a dispersion stabilizer becomes unstable when large amounts of film-forming additives are contained therein. In order to use such an emulsion composition in these fields, a film obtained from it must be made very dense, and for this purpose, a water-soluble resin is usually added to the emulsion composition. Since this water-soluble resin usually contains a neutralizing agent and a water-soluble organic solvent, the emulsion system becomes very unstable by their presence. In addition, the water resistance of the coated film is inferior because of the use of an ionic or nonionic low molecular or high molecular substance as a dispersion stabilizer. These defects have precluded conventional emulsion compositions from wide commercial acceptance. Furthermore, the use of such a conventional emulsion composition as an adhesive has the disadvantage that the surface-active agent therein oozes out onto the surface of the applied adhesive to stain its surface.

Various attempts have therefore been made to obtain an aqueous emulsion composition which is free from the aforesaid defects of conventional aqueous emulsion compositions containing ordinary ionic or nonionic low molecular or high molecular surface-active agents as dispersion stabilizers. One of such attempts involves the use of a water-soluble resin as the dispersion stabilizer, and for example, water-soluble acrylic resins, maleinized polybutadiene, maleinized oils, maleinized alkyd resins, etc. were proposed for use as dispersion stabilizers. The water-soluble acrylic resins have favorable properties, but because a hydrophilic portion and a non-hydrophilic portion are not clearly distinct from each other in the molecular skeleton of such an acrylic resin, it is difficult to obtain an emulsion composition having superior stability by using such a water-soluble acrylic resin as a dispersion stabilizer. In order to avoid this inconvenience, attempts have been made to use the water-soluble acrylic resins after modifying them into block copolymers or graft copolymers. However, block copolymers and graft copolymers so prepared and having the desired properties have not been discovered so far.

The other water-soluble resins such as maleinized polybutadiene, maleinized oils and maleinized alkyd resins are soft flexible resins and contain a number of oxidation-curable groups. Accordingly, an aqueous emulsion composition containing such a water-soluble resin as a dispersion stabilizer gives a coated film which exhibits tackiness at the early stage of its curing and turns yellow on long-term exposure. Consequently, its uses are limited.

In order to provide an aqueous emulsion composition free from the above defects, that is, an aqueous emulsion composition which has excellent dispersion stability and gives a coated film having excellent water resistance, yellowing resistance, gloss, good surface feel with no surface tackiness even in the early stage of curing, gasoline resistance, and polishability (the property of the coated film to be free from softening by the heat of friction when it is polished), the present inventors made assiduous investigations about the introduction of a rigid cellulose derivative which has a strong intermolecular cohesive force into the emulsion particles without destroying the stability of the emulsion by using a water-soluble resin which is different from a conventional oxidation-curable water-soluble resin as a dispersion stabilizer.

Introduction of a cellulose derivative into emulsion particles was suggested in the past (see Japanese Laid-Open Patent Publication No. 28188/76 which is a counterpart of U.S. patent application Ser. No. 485,271 now Pat. No. 3,953,386). This patent document discloses that an aqueous emulsion composition is prepared by mixing water, a surface-active agent, at least one polymer (an example of which is a cellulose derivative) and at least one monomer to form an aqueous dispersion of polymer-monomer particles, and then radical-polymerizing the monomer in the particles.

When a cellulose derivative is used as the polymer component in this method, emulsification of the cellulose derivative-monomer should be performed sufficiently prior to polymerization until the emulsified particles attain a size of an emulsion unit, namely until they have an average particle diameter of 0.01 to 5 microns. For this purpose, a relatively large amount of a surface-active agent must be used, and this inevitably leads to the defect that a coated film formed from the resulting aqueous emulsion composition has poor water resistance. Furthermore, since the cellulose derivative used is rigid, the resulting aqueous emulsion composition cannot generally be used as a coating composition without the addition of a film-forming additives. However, the aqueous emulsion composition of the prior art obtained by using an ordinary ionic or nonionic low-molecular or high molecular surface-active agent as a dispersion stabilizer becomes unstable if a large amount of the film-forming additive is used. Or when the film-forming additive is a water-insoluble compound, the resulting emulsion composition may become flammable. Another defect is that when a water-soluble resin is added to the emulsion composition containing a cellulose derivative, the emulsion system becomes unstable owing to a neutralizing agent or a water-soluble organic solvent contained therein. Because of these defects, the aforesaid aqueous emulsion composition containing a cellulose derivative has not gained commercial acceptance.

With such a technical background, the present inventors assiduously made investigations in order to introduce a rigid cellulose derivative which has a strong intermolecular force into emulsion particles by subjecting emulsified particles of the cellulose derivative-radical polymerizable unsaturated monomer to emulsion polymerization using general known water-soluble resins as a dispersion stabilizer.

These investigations has led to the discovery that the above purpose cannot be achieved by using the generally known water-soluble resins as such, but if a specified water-soluble resin having a graft-polymerizable unsaturated group in the side chain to be described in detail in the present application is used as a dispersion stabilizer, the object of this invention can be achieved, and the emulsion obtained in the copresence of the water-souble resin and the cellulose derivative exhibits higher stability.

Thus, according to this invention, there is provided an emulsion composition containing a cellulose derivative, which is the product of emulsion polymerization of a mixture of at least one radical-polymerizable unsaturated monomer and at least one cellulose derivative in the presence of a water-soluble resin having a graft-polymerizable unsaturated group in the side chain.

The water-soluble resin used as a dispersion stabilizer in the aqueous emulsion composition of this invention has in the side chain and/or skeleton of the resin a graft-polymerizable unsaturated group which has a reduced effect of chain transfer and can form a long side chain by grafting. Accordingly, even when it is used in a small amount, the water-soluble resin moderately reacts graftingly with the radical-polymerizable unsaturated monomer during the emulsion polymerization to form a long side chain. Since the grafted product so formed polymerizes in situ with the cellulose derivative present in the reaction system, they are well entangled to achieve very good dispersion stability.

Moreover, the emulsion composition of this invention does not contain an ordinary ionic or nonionic low molecular or high molecular surface-active substance or a known water-soluble oxidation-curable resin as a dispersion stabilizer, and the rigid cellulose derivative having a strong intermolecular cohesive force is contained in stable form in the emulsion particles. Hence, the emulsion composition of this invention has the excellent advantage that when formulated into a coating composition and coated on a substrate, can give a coated film which has a tack-free surface of good feel and exhibits excellent water resistance, yellowing resistance, gasoline resistance, polishability and gloss.

In addition, when the composition of this invention is used as an adhesive, it is advantageously free from the defect that the dispersion stabilizer oozes out to stain the surface of the adhesive.

The cellulose derivative to be introduced into polymer emulsion particles should give a coated film having a tack-free surface of good feel and also possessing superior polishability and other properties when the resulting polymer emulsion composition is coated on a substrate. The cellulose derivative capable of achieving this purpose includes ester-modified and ether-modified cellulose derivatives which have a rigid main chain, a strong intermolecular cohesive force, and a number average molecular weight of generally about 3,000 to about 200,000, preferably about 5,000 to about 50,000. Desirably, these cellulose derivatives have compatibility with the water-soluble resin, and/or with the grafted product formed between the water-soluble resin and the radical-polymerizable unsaturated monomer during the emulsion polymerization. Since the available types of cellulose derivatives are limited, it is the general practice to choose water-soluble resins which are compatible with the cellulose derivatives to be used in combination.

Typical examples of the ester-modified cellulose derivatives are nitrocellulose, cellulose acetate butyrate, cellulose acetate propionate, cellulose acetate phthalate, acetyl cellulose, cellulose propionate, cellulose butyrate, cellulose phosphate, and cellulose sulfate. Those having an average degree of esterification of generally 15 to 70%, especially 20 to 60%, are preferred.

Typical examples of the ether-modified cellulose derivatives include methyl cellulose, ethyl cellulose, butyl cellulose, benzyl cellulose, carboxy methyl cellulose, carboxy ethyl cellulose, aminoethyl cellulose, hydroxyethyl cellulose, oxyethyl cellulose, hydroxypropyl cellulose, and hydroxypropyl methyl cellulose. Those having an average degree of etherification of generally 30 to 70%, especially 35 to 60%, are preferred.

Nitrocellulose and cellulose acetate butyrate are especially preferred because of their excellent weatherability and moderate price.

The above-exemplified cellulose derivatives may be used singly or in combination with each other.

The "water-soluble resin having a graft-polymerizable unsaturated group in the side chain" used as a dispersion stabilizer in the aqueous emulsion composition of this invention should be a resin which by itself can be water-solubilized by neutralization treatment with acids or alkalies, and has the ability to form a film having sufficient durability.

Typical examples of the water-soluble resin are described below. It should be understood however that these are merely illustrative, and are not intended to limit the scope of the invention.

(A) Water-soluble resins prepared by addition reaction between carboxyl-containing vinyl polymers and glycidyl-containing vinyl monomers:

Advantageously, the "carboxyl-containing vinyl polymers" used to prepare the water-soluble resins are obtained by copolymerizing $\alpha,\beta$-ethylenically unsaturated carboxylic acids with radical-polymerizable unsaturated monomers in a customary manner. The $\alpha,\beta$-ethylenically unsaturated carboxylic acids include unsaturated aliphatic mono- or poly-carboxylic acids of the type wherein an addition-polymerizable double bond exists between the carbon atom to which the carboxyl group is bonded and an adjacent carbon atom. Suitable are those containing 3 to 8 carbon atoms, particularly 3 to 5 carbon atoms, and one or two carboxyl groups. Those of the following general formula

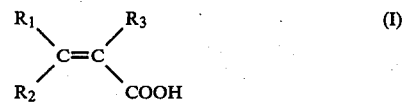

$$\begin{array}{c} R_1 \\ \diagdown \\ R_2 \end{array} C=C \begin{array}{c} R_3 \\ \diagdown \\ COOH \end{array} \quad (I)$$

wherein $R_1$ represents a hydrogen atom or a lower alkyl group, $R_2$ represents a hydrogen atom, a lower alkyl group or a carboxyl group, and $R_3$ represents a hydrogen atom, a lower alkyl group or a carboxy-lower alkyl group, are preferred. In formula (I), the lower alkyl group preferably has up to 4 carbon atoms, and a methyl group is especially preferred.

Examples of the $\alpha,\beta$-ethylenically unsaturated carboxylic acid are acrylic acid, methacrylic acid, crotonic acid, itaconic acid, maleic acid, maleic anhydride, fumaric acid, and monoalkyl ($C_{1-8}$) esters of maleic acid. These carboxylic acids can be used either singly or as a mixture of two or more.

The "radical-polymerizable unsaturated monomer" which is radical-polymerizable with the $\alpha,\beta$-ethylenically unsaturated carboxylic acid may be any monomer which has a radical polymerizable ethylenically unsaturated bond (>C=C<), and can be selected broadly depending upon the properties desired of the aqueous emulsion composition as a final product. Typical examples of such an unsaturated monomer are given below.

(a) Acrylic or methacrylic acid esters $C_{1-8}$ alkyl or cycloalkyl esters of acrylic or methacrylic acid such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and cyclohexyl methacrylate; alkoxyalkyl esters of acrylic or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_{2-8}$ hydroxyalkyl esters of acrylic or methacrylic acid such as hydroxyethyl acrylate, hydroxyethyl methacrylate, hydroxyethyl methacrylate, hydroxypropyl acrylate and hydroxypropyl methacrylate; monoesters between acrylic or methacrylic acid and polyalkylene glycols (e.g., polyethylene glycol or polypropylene glycol), such as polyethylene glycol monoacrylate, polyethylene glycol monomethacrylate, polypropylene glycol monoacrylate and polypropylene glycol monomethacrylate; and adducts between glycidyl acrylate or glycidyl methacrylate and $C_{2-18}$ monocarboxylic compounds (e.g., acetic acid, propionic acid, stearic acid, or lauric acid).

(b) Vinyl aromatic compounds

Styrene, α-methylstyrene, vinyltoluene, p-chlorostyrene and vinylpyridine.

(c) Polyenes

Butadiene, isoprene and chloroprene.

(d) Acrylic or methacrylic acid amide

Acrylamide, N-methylol acrylamide, and N-butoxymethyl acrylamide.

(e) Other compounds

Acrylonitrile, methacrylonitrile, ethylene, propylene, butene, methylisopropenyl ketone, vinyl acetate, vinyl propionate, vinyl chloride, vinylidene chloride, vinyl esters (vinyl esters of aliphatic or aromatic monobasic or polybasic acids), Veova monomer (a trademark for a product of Shell Chemical Co.), and dialkyl ($C_{1-8}$) esters of maleic acid.

These unsaturated monomers are properly selected according to the desired properties, and may be used singly or as a mixture of two or more.

In the present invention, the "glycidyl-containing vinyl monomer" which adds to the carbonyl group of the carboxyl-containing vinyl polymer prepared from the aforesaid monomer may be a monomer having one glycidyl group of the formula

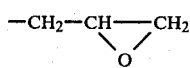

and one ethylenically unsaturated bond (>C=C<) in the molecule. Examples are glycidyl acrylate, glycidyl methacrylate and allyl glycidyl ether.

Copolymerization of the α, β-ethylenically unsaturated carboxylic acid with the radical-polymerizable unsaturated monomer is carried out by methods known per se for production of acrylic copolymers, for example by a solution-polymerization, emulsion-polymerization or suspension-polymerization technique. Advantageously, it is carried out by the solution polymerization method. Generally, the copolymerization can be carried out by reacting the two components in a suitable inert solvent in the presence of a polymerization catalyst at a temperature of usually about 0° to about 180° C., preferably about 40° to about 170° C., for a period of about 1 to about 20 hours, preferably about 4 to about 10 hours.

The solvent used is desirably a water-miscible solvent capable of dissolving the resulting copolymer so that gellation does not occur during the copolymerization reaction. Examples of such a solvent include Cellosolve-type solvents, carbitol-type solvents, glyme-type solvents, Cellosolve acetate-type solvents, and alcohol-type solvents.

The polymerization catalyst may be a radical initiator for usual radical polymerization, such as azo compounds, peroxide compounds, sulfides, sulfines, diazo compounds, nitroso compounds and redox systems.

In the copolymerization reaction, the ratio of the α, β-ethylenically unsaturated carboxylic acid and the radical-polymerizable unsaturated monomer is not strictly limited, and can be varied depending upon the number of graft-polymerizable side chains required of the water-soluble resin. Generally, the weight ratio of the α, β-ethylenically unsaturated carboxylic acid to the radical polymerizable unsaturated monomer is from 3:97 to 70:30, preferably from 7:93 to 50:50.

The carboxyl-containing vinyl polymer obtained by the aforesaid reaction may have a number average molecular weight of generally about 300 to about 100,000, preferably about 800 to about 50,000, and an acid value of generally 10 to 300, preferably 30 to 200.

The carboxyl-containing vinyl polymer so prepared can be subjected as such to addition reaction with the glycidyl-containing vinyl monomer in a solvent to give a water-soluble resin as a dispersion stabilizer. The addition can be performed at a reaction temperature of about 60° to about 220° C., preferably about 120° to about 170° C., for a reaction period of about 0.5 to about 40 hours, preferably 3 to 10 hours.

The glycidyl-containing vinyl monomer is added in an amount of generally 0.1 to 30% by weight, preferably 0.5 to 10% by weight, based on the total weight of the carboxyl-containing vinyl polymer and the glycidyl-containing vinyl monomer.

The production of the water-soluble resin described above has the advantage that since the polymerization reaction and the addition reaction can be continuously carried out in an organic solvent, the production is very easy, and the resulting resin solution can be used in the as-obtained form as a dispersion stabilizer for an emulsion.

(B) Water-soluble resins prepared by the addition reaction of a vinyl polymer containing a carboxyl group and a hydroxyl group with vinyl isocyanate or a mono-adduct between a diisocyanate compound and a hydroxyl-containing acrylic monomer:

The "vinyl polymer containing a carboxyl group and a hydroxyl group" used to prepare the water-soluble resin of this type is prepared in the same way as in the process for producing the aforesaid carboxyl-containing vinyl polymer except that a hydroxyl-containing acrylic monomer, for example the $C_{2-8}$ hydroxyalkyl ester of acrylic or methacrylic acid exemplified in (a) above as typical examples of the radical-polymerizable unsaturated monomer, and the aforesaid α, β-unsaturated carboxylic acid such as the carboxylic acid of formula (I) are used as essential components, and as required, the aforesaid other radical-polymerizable unsaturated monomer is used as a comonomer component, and a hydroxyl-containing solvent is not used as the solvent.

The vinyl polymer so produced having both a carboxyl group and a hydroxyl group may have an acid value of generally 10 to 300, preferably 30 to 200, and a hydroxyl value of generally 2 to 150, preferably 5 to 50, and a number average molecular weight of about 300 to about 100,000, desirably 800 to 50,000.

The water-soluble resin is prepared by addition reaction of the resulting vinyl polymer containing a carboxyl group and a hydroxyl group with vinyl isocyanate or a mono-adduct formed between a diisocyanate compound and a hydroxyl-containing acrylic monomer (the mono-adduct is referred to hereinbelow as an "isocyanate-modified acrylic monomer").

The "isocyanate-modified acrylic monomer" is obtained by reacting the hydroxyl-containing acrylic monomer with the diisocyanate compound. Suitable hydroxyl-containing acrylic monomers used are, for example, the $C_{2-8}$ hydroxyalkyl esters of acrylic or methacrylic acid, and the monoesters of acrylic or methacrylic acid with polyethylene glycol or polypropylene glycol shown as typical examples (a) of the radical polymerizable unsaturated monomer used in the production of the carboxyl-containing vinyl polymer in section (A) above.

The "diisocyanate compound" to be reacted with the hydroxyl-containing acrylic monomer may be any of aliphatic, alicyclic, aromatic and araliphatic diisocyanate compounds normally used in the production of polyurethane.

Specific examples of the diisocyanate compounds are given below.

OCN—(CH$_2$)$_a$—NCO (a = 2-12),
OCN—CH$_2$—CH$_2$—S—CH$_2$—CH$_2$—NCO,

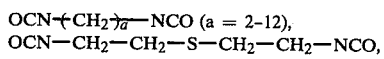

OCN—CH$_2$—CH$_2$—CH$_2$—O—CH$_2$—CH$_2$—CH$_2$—NCO,

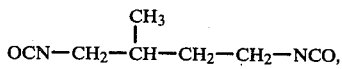

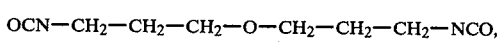

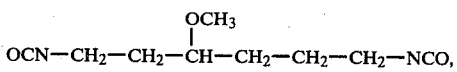

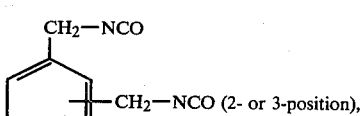

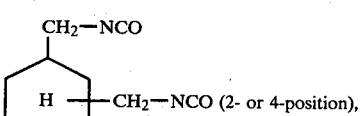

-continued

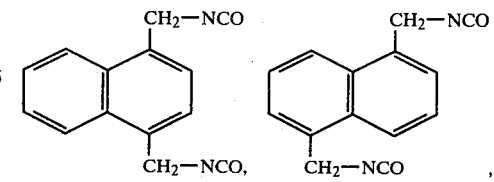

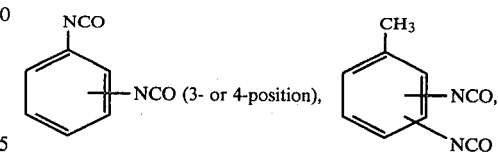

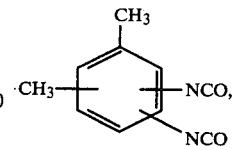

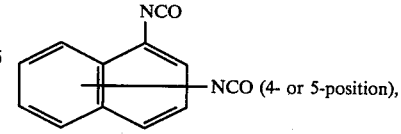

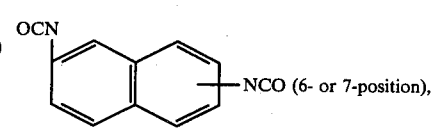

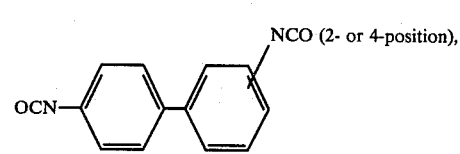

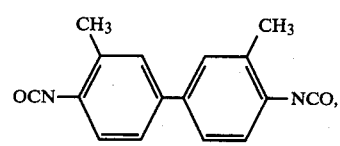

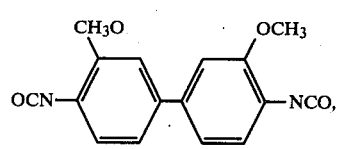

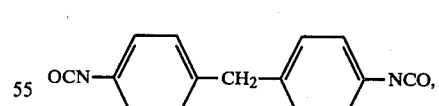

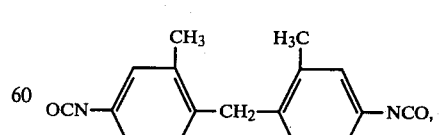

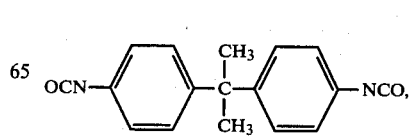

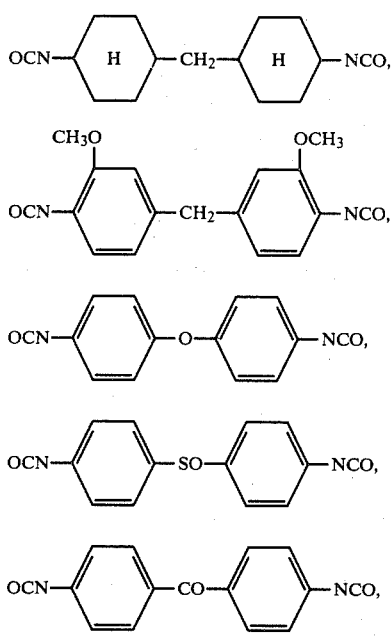

lysine diisocyanate, and isophorone diisocyanate.

These diisocyanate compounds may be used singly or as a mixture of two or more.

Among these diisocyanate compounds, 1,6-hexamethylene diisocyanate, lysine diisocyanate, isophorone diisocyanate, dicyclohexylmethane-4,4′-diisocyanate, xylylene diisocyanate, and hydrogenated toluene diisocyanate have excellent resistance to yellowing.

In the production of the isocyanate-modified acrylic monomer, the hydroxyl-containing acrylic monomer is subjected to mono-additon reaction with the diisocyanate compound. It is advantageous in this case to use 0.6 to 1.4 moles, preferably 0.9 to 1.1 moles, of the acrylic monomer per mole of the diisocyanate compound.

Mono-addition reaction can be performed by contacting the two reactants in a customary manner. Generally, the reaction can be carried out at a temperature of about 20° to about 150° C. for a period of about 0.5 to about 40 hours. If desired, it is advantageous to use a polymerization inhibitor such as hydroquinone, ditertiary butyl hydroxytoluene, methoxyphenol, tertiary butyl catechol and benzoquinone in the addition reaction as required.

Thus, an isocyanate-modified acrylic monomer containing one free isocyanate group is obtained.

Vinyl isocyanate or the isocyanate-modified acrylic monomer prepared as above adds to the vinyl polymer by the reaction of the free isocyanate in the isocyanate compound with the hydroxyl group of the hydroxyl-containing vinyl polymer, thereby forming the water-soluble resin in accordance with this invention.

The reaction may be carried out in a customary manner in the inert solvent exemplified hereinabove. Usually, the reaction is carried out as a reaction temperature of about 20° to about 150° C. for a reaction period of about 0.5 to about 40 hours. As required, known reaction catalysts and polymerization inhibitors may be used.

In obtaining the water-soluble resin in accordance with the above reaction, the amount of the vinyl isocyanate or the isocyanate-modified acrylic monomer to be reacted with the vinyl polymer having a carboxyl group and a hydroxyl group is generally 0.1 to 30% by weight, preferably 0.5 to 10% by weight, based on the total weight of the vinyl polymer and the vinyl isocyanate or the isocyanate-modified acrylic monomer.

(C) Water-soluble resins having a monomer containing both a radical-polymerizable unsaturated group and at least one graft-polymerizable unsaturated group in one molecule as an essential component:

This type of water-soluble resin is a copolymer obtained by copolymerizing (i) a monomer containing both one radical-polymerizable unsaturated group of the formula

wherein $R_4$ represents a hydrogen atom or a methyl group and $R_5$ represents

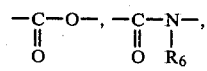

a phenylene group, or a lower alkenylene group, and
$R_6$ represents a hydrogen atom or a methyl or ethyl group, and at least one graft polymerizable unsaturated group in one molecule, (ii) an α, β-ethylenically unsaturated acid, and/or a monoester of a polyalkylene glycol with acrylic or methacrylic acid, and (iii) another radical-polymerizable unsaturated monomer.

The "radical polymerizable unsaturated group" contained in the monomer (i) which is represented by general formula (II) above specifically includes, for example, $CH_2=CHCOO-$, $CH_2=C(CH_3)COO-$,

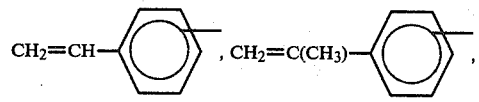

$CH_2=CHCONH-$, $CH_2=C(CH_3)CONH-$, and $CH_2=CH-CH=CH-$, Of these, $CH_2=CHCOO-$ and $CH_2=C(CH_3)COO-$ are preferred.

The "graft-polymerizable unsaturated group" denotes a group derived from an unsaturated compound having a hydrogen atom active in radical chain transfer reaction at the β-position of an unsaturated group. It should exhibit low activity on a radical polymerization reaction and can exist as an active site for grafting reaction in the copolymer obtained by the radical copolymerization of the monomers (i), (ii) and (iii).

A preferred group of graft-polymerizalbe unsaturated groups include unsaturated groups of the following formulae

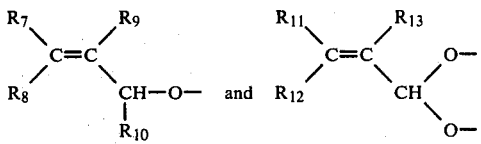

(III) and (IV)

wherein each of $R_7$ through $R_{13}$ represents a hydrogen atom or a $C_{1-8}$ alkyl group.

Another suitable group of unsaturated groups include unsaturated groups derived from 5- or 6-membered cyclic compounds having an intra-ring carbon-carbon double bond, for example

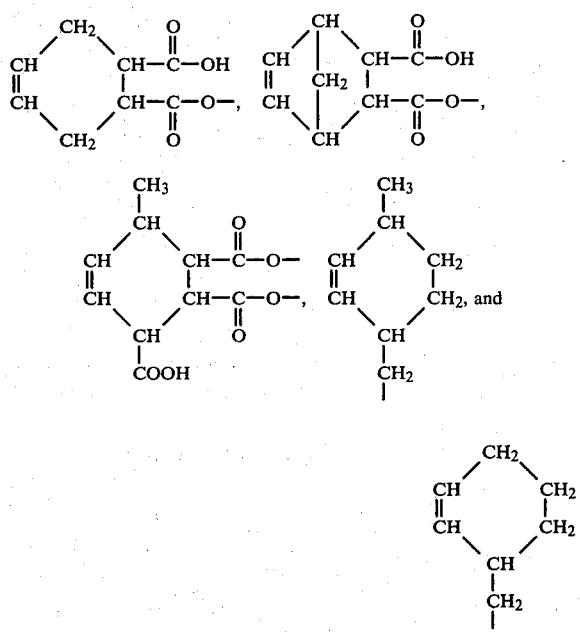

Specific examples of the graft-polymerizable unsaturated group represented by formula (III) or (IV) above are $CH_2\!=\!CH\!-\!CH_2\!-\!O\!-\!$, $CH_3\!-\!CH\!=\!CH\!-\!CH_2\!-\!O\!-\!$, $CH_2\!=\!CH(CH_3)\!-\!CH_2\!-\!O\!-\!$, $CH_2\!=\!CH\!-\!CH(CH_3)\!-\!O\!-\!$, and

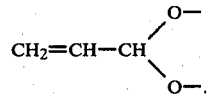

Of these, $CH_2\!=\!CH\!-\!CH_2\!-\!O\!-\!$ and

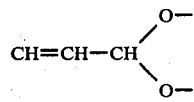

are preferred.

The monomer (i) may contain one radical polymerizable unsaturated group described above and at least one, advantageously 1 to 3, graft-polymerizable unsaturated group. The monomer (i) may also contain an atomic grouping inert to the polymerization in addition to the above two kinds of unsaturated groups. The monomer (i), on the whole, may have a molecular weight of generally in the range of 100 to 400. Specific examples of the monomer (i) are given below.

(1) Esters formed between acrylic or methacrylic acid and a monohydric alcohol selected from allyl alcohol, ethylene glycol monoallyl ether, trimethylolpropane diallyl ether and a condensation product between acrolein and trimethylolethane, trimethylolpropane or glycerol.

(2) Adducts of acrylic or methacrylic acid with allyl glycidyl ether.

(3) Products obtained by reacting a hydroxyl-containing acrylic monomer [for example, a hydroxyalkyl (meth)acrylate such as hydroxyethyl acrylate, hydroxyethyl methacrylate, hydroxypropyl acrylate or hydroxypropyl methacrylate] and the monohydric alcohol mentioned in (1) above with a diisocyanate compound (aliphatic, alicyclic and aromatic diisocyanate compounds usually employed in the production of polyurethane).

(4) Esterification products formed between tetrahydrophthalic anhydride, 3,6-endomethylene tetrahydrophthalic anhydride, etc. and the hydroxyl-containing acrylic or methacrylic monomer described in (3) above.

The $\alpha$, $\beta$-ethylenically unsaturated acid (ii) used to impart water-solubility to the copolymer obtained includes aliphatic unsaturated mono- or di-carboxylic acids having 3 to 22 carbon atoms, preferably 3 to 6 carbon atoms, the anhydrides or monoesters of the dicarboxylic acids, and vinyl aromatic mono- or di-sulfonic acids having 8 to 12 carbon atoms. Specific examples are $\alpha$, $\beta$-ethylenically unsaturated carboxylic acids such as acrylic acid, methacrylic acid, crotonic acid, itaconic acid, maleic acid, maleic anhydride, fumaric acid, and mono-$(C_1\text{-}C_8)$ alkyl esters of maleic acid, and $\alpha$, $\beta$-ethylenically unsaturated sulfonic acids such as styrenesulfonic acid. They may be used either singly or as a mixture of two or more.

The "monoester between a polyalkylene glycol and acrylic or methacrylic acid" used as the component (ii) includes products obtained by esterifying one OH of the polyalkylene glycol such as polyethylene glycol or polypropylene glycol having a molecular weight of usually 40 to 500, preferably 80 to 400, with acrylic or methacrylic acid.

The monoester compound may be used singly or in combination with the $\alpha$, $\beta$-ethylenically unsaturated acid as the component (ii).

The "other radical polymerizable unsaturated monomer" (iii) which can be radical-polymerized with the monomer components (i) and (ii) may be any monomer which has a radical-polymerizable ethylenically unsaturated bond ($>\!C\!=\!C\!<$). In order that the polymerization may not be hampered by a graft-polymerizable unsaturated group such as an allyl group, it may be selected broadly from monomers having a Q value, in the "Q-e theory", of at least 0.1 depending upon the properties desired of the aqueous emulsion composition as a final product. Typical examples of such an unsaturated monomer are the same as shown in section (A), (a) to (c) given hereinabove. These unsaturated monomers may be used singly or as a mixture of two or more.

Copolymerization of the monomer components (i), (ii) and (iii) can be performed by methods known per se for the production of acrylic copolymers, for example by the solution-polymerization, emulsion-polymerization, or suspension-polymerization technique. Advantageously, it is carried out in accordance with the solution-polymerization method. It can be carried out by reacting the three components in a suitable inert solvent in the presence of a polymerization catalyst at a reaction temperature of usually about 0° to about 180° C., preferably about 40° to about 170° C., and for a reaction period of about 0.5 to about 20 hours, preferably about 2 to about 10 hours.

The solvent used is desirably a water-miscible solvent capable of dissolving the resulting copolymer so that gellation does not occur during the copolymerization reaction. Examples of the solvent are Cellosolve-type solvents, carbitol-type solvents, glyme-type solvents, Cellosolve acetate-type solvents and alcohol-type solvents.

The polymerization catalyst may be a radical initiator for usual radical polymerization, such as azo compounds, peroxide compounds, sulfides, sulfines, diazo compounds, nitroso compounds, and redox systems.

In performing the copolymerization, the mixing proportions of the three components may be varied depending upon the properties desired of the aqueous emulsion composition as a final product. The suitable proportions based on the total weight of the three components are as follows:

Monomer component (i):
0.1 to 30% by weight, preferably 0.5 to 10% by weight

Monomer component (ii):
2 to 60% by weight, preferably 5 to 30% by weight, when the α, β-ethylenically unsaturated acid is used; 10 to 80% by weight, preferably 20 to 50% by weight, when the monoester of the polyalkylene glycol and acrylic or methacrylic acid is used; the amount of the monoester may be below 10% by weight when the two compounds are conjointly used.

Monomer component (iii):
10 to 97.9% by weight, preferably 50 to 90% by weight.

The method for producing the water-soluble resin (C) described above, although limited in the types of monomers to be chosen, is especially advantageous in commercial practice because it does not involve reaction of the monomer with the polymer and can easily afford the desired product when practiced within the ranges described herein.

It is very desirable that the water-soluble resin obtained by the processes (A) to (C) described above have an acid value of 10 to 350, preferably 20 to 250, more preferably 30 to 200, and a number average molecular weight of 500 to 100,000, preferably 800 to 50,000, more preferably 1,000 to 20,000. For this purpose, it is desirable to adjust the amount of the carboxyl groups in the preparation of the vinyl polymer so that the resulting water-soluble resin has the aforesaid acid value, and to adjust the reaction conditions such that the number average molecular weight of the resin falls within the aforesaid range.

The resulting water-soluble resin is water-solubilized either as such or after at least a part of the solvent has been distilled off from it. The water-solubilization can be performed in a customary manner by, for example, neutralizing the carboxyl groups present in the resin with a conventional known neutralizing agent such as an amine, ammonia, or an alkali metal hydroxide.

When the monoester of acrylic or methacrylic acid and the polyethylene glycol or polypropylene glycol is used as one monomer component constituting the water-soluble resin in accordance with this invention, water-solubilization of the resin may sometimes be achieved without neutralization of the carboxyl groups. To achieve this, it is necessary to impart a high level of hydrophilicity to the copolymer itself by copolymerizing a large proportion (10 to 90% by weight, preferably 20 to 80% by weight) of the monoester. In this case, too, neutralization of the carboxyl groups may be employed together to achieve water solubilization.

According to this invention, a mixture of a radical-polymerizable unsaturated monomer and the cellulose derivative described hereinabove is emulsion-polymerized in an aqueous medium in the presence of the aforesaid water-soluble resin as a dispersion stabilizer. The "radical-polymerizable unsaturated monomer" is not particularly restricted so long as it has compatibility with the water-soluble resin and has moderate hydrophilicity. Typical examples of this monomer are shown below.

(i) Vinyl aromatic compounds $C_8$–$C_{10}$ vinylbenzene derivatives such as styrene, α-methylstyrene and vinyltoluene, and vinyl heteroaromatic compounds such as vinylpyridine.

(ii) Acrylic or methacrylic acid esters $C_1$–$C_{20}$ alkyl or cycloalkyl esters of acrylic or methacrylic acid such as methyl acrylate, ethyl acrylate, propyl acrylate, isopropyl acrylate, butyl acrylate, hexyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and cyclohexyl methacrylate; adducts between glycidyl acrylate or glycidyl methacrylate and $C_2$–$C_{20}$ monocarboxylic acid compounds (such as acetic acid, propionic acid, oleic acid, stearic acid and lauric acid); alkoxyalkyl esters of acrylic or methacrylic acid such as methoxybutyl acrylate, methoxyethyl acrylate, ethoxybutyl acrylate, methoxybutyl methacrylate, methoxyethyl methacrylate and ethoxybutyl methacrylate; condensation products between $C_2$–$C_8$ hydroxyalkyl esters of acrylic or methacrylic acid (such as hydroxyethyl acrylate, hydroxypropyl methacrylate or hydroxyethyl methacrylate) and the aforesaid $C_2$–$C_{20}$ monocarboxylic acid compounds.

(iii) Polyenes having 2 to 8 carbon atoms such as butadiene, isoprene and chloroprene.

(iv) Vinyl esters of carboxylic acids such as vinyl acetate and Veova monomer (a trademark for a product of Shell Chemical Co.).

(v) Other monomers such as vinyl chloride, vinylidene chloride, and monolefins such as ethylene, propylene and isobutene.

The vinyl aromatic compounds and the acrylic or methacrylic acid esters are especially preferred as the radical-polymerizable unsaturated monomer for use in this invention.

The unsaturated monomer is selected depending upon the properties desired of the final emulsion composition. These unsaturated monomers may be used singly or as a mixture of two or more. When a non-hydrophilic monomer is used as the unsaturated monomer, it may be used together with not more than 50% by weight, preferably not more than 30% by weight, based on the total weight of the monomers used, of a hydrophilic unsaturated monomer. Examples of the hydrophilic unsaturated monomer include 2-hydroxyethyl acrylate, 2-hydroxyethyl methacrylate, 2- hydroxypropyl acrylate, 2-hydroxypropyl methacrylate, acrylonitrile, methacrylonitrile, acrylic acid, methacrylic acid, glycidyl acrylate, glycidyl methacrylate, acrylamide, N-n-butoxymethyl acrylamide, vinylpyridine, N-methylol acrylamide and methacrylamide. These hydrophilic unsaturated monomers may be used singly or as a mixture of two or more.

The emulsion polymerization is carried out by known conventional methods. For example, it is carried out in the presence of the aforesaid dispersion stabilizer with stirring or in the stationary state at a temperature above the freezing point of water but below the boiling point of water using the aforesaid polymerization initiator as required. The aqueous medium as a reaction medium in the emulsion polymerization may be water itself, or a mixture of water and the aforeesaid water-miscible organic solvent.

In order to improve dispersion of the cellulose derivative in the above emulsion polymerization procedure, the cellulose derivative is dissolved in the unsaturated monomer in advance, and after reducing the viscosity of the solution, it is dispersed in the water-soluble resin; or a mixed solution of the cellulose derivative, the unsaturated monomer and the water-soluble resin is dispersed in water and then used in the emulsion polymerization.

The amount of the water-soluble resin used as a dispersion stabilizer is generally 2 to 90% by weight, preferably 5 to 50% by weight, based on the total solids content of the emulsion obtained.

The amount of the cellulose derivative to be introduced into the resulting emulsion particles is generally 3 to 97% by weight, preferably 5 to 70% by weight, based on the solids content obtained by subtracting the amount of the water-soluble resin used as a dispersion stabilizer from the total solids content (the sum of the water-soluble resin, the cellulose derivative and the radical-polymerizable unsaturated monomer) in the emulsion. Accordingly, the amount of the radical-polymerizable unsaturated monomer is the balance.

The emulsion composition containing a cellulose derivative so obtained can be directly used as a film-forming component of a coating composition, and is also useful as a component of an adhesive. As required, the emulsion composition may contain another water-soluble resin, an extender pigment, a coloring pigment, a rust inhibitor, a plasticizer, an organic solvent, etc. in amounts usually empolyed.

Since in the emulsion composition of this invention, the emulsion particles therein contain the cellulose derivative which is rigid and has a strong intermolecular cohesive force, the surface of a dried film prepared from the emulsion composition does not show tackiness but excellent feel. Another advantage is that owing to the rigidity of the cellulose derivative, a coated film prepared from the emulsion composition has very good polishability, gasoline resistance and other properties. In addition, since the aforesaid specified water-soluble resin is used as a dispersion stabilizer in the emulsion composition of this invention, a coated film prepared from it has excellent water resistance, yellowing resistance and gloss.

The emulsion composition of this invention containing a cellulose derivative can be used in versabile paints either as such or together with another water-soluble resin or a water-dispersible resin. The resulting film cures sufficiently at ordinary temperature, but if desired, it may be cured under heat. The emulsion composition of this invention may also be used as an adhesive or for resin treatment.

The following Examples and Comparative Examples illustrate the present invention more specifically. Unless otherwise specified, all percentages in these examples are by weight.

EXAMPLE 1

Butyl Cellosolve (556 g) was added to a 2-liter four-necked flask, and heated to 120° C. A mixture of 77 g of ethyl acrylate, 73 g of methyl methacrylate, 108 g of acrylic acid, 198 g of 2-ethylhexyl methacrylate and 32 g of azobisdimethylvaleronitrile was added dropwise over 2 hours. One hour after the addition, 5 g of azobisisobutyronitrile was added. Then, the temperature of the contents was gradually raised and brought to 158° C. in two hours. At this temperature, the reaction was performed for 1 hour.

Then, the temperature of the contents was lowered to 130° C., and 30 g of glycidyl methacrylate was added dropwise to the reaction mixture over 30 minutes. The reaction was performed then at 135° C. for 2 hours until the acid value of the reaction mixture became constant. After the reaction, a part of the butyl Cellosolve was removed to afford a solution of a water-soluble resin having an acid value of 109 and a solids content of 80.9%.

The resulting resin solution (99 g), 37 g of butyl Cellosolve, 166 g of n-butyl methacrylate and 59 g of nitrocellulose wetted with 30% isopropyl alcohol (FQ type SS ¼, a tradename for a product of Daicel Ltd.) were mixed to form a solution. To the solution were added 11 cc of 29% aqueous ammonia and 362 g of water, and the mixture was well stirred. A solution of 0.5 g of ammonium persulfate in 5 g of water was added to the resulting water dispersion, and the mixture was heated at 80° C. for 3 hours.

The properties of the resulting emulsion composition containing the cellulose derivative and a film formed by coating the emulsion composition on a glass plate or a surface-treated steel plate are shown in Table 1. The coating was performed to a thickness of about 20 microns using a doctor blade (the same coating method was used in the following Examples and Comparative Examples).

EXAMPLE 2

Example 1 was repeated except that 41 g of cellulose acetate butyrate (CAB-551 0.2, a tradename for a product of Eastman Chemical Co.) was used instead of the nitro cellulose. The properties of the resulting emulsion composition and a film formed from it are shown in Table 2.

EXAMPLE 3

Toluene (556 g) was added to a 2-liter four-necked flask and heated to 110° to 120° C., and a mixture of 77 g of ethyl acrylate, 173 g of methyl methacrylate, 198 g of 2-ethylhexyl methacrylate, 93 g of acrylic acid, 15 g of hydroxyethyl methacrylate and 32 g of azobisdimethylvaleronitrile was added dropwise over 2 hours. One hour after the addition, 5 g of azobisdimethylvaleronitrile was added. The reaction was performed at this temperature for 6 hours to afford a solution of an acrylic polymer having a carboxyl group and a hydroxyl group.

Separately, 696 g of tolylene diisocyanate was put into a 2-liter four-necked flask, and heated to 50° C. A solution consisting of 520 g of hydroxyethyl methacrylate and 1 g of hydroquinone was added dropwise over 4 hours. Thereafter, the reaction was continued at this temperature for 3 hours.

The reaction mixture was put into a can and after sealing the can, was left to stand at room temperature for 1 day. Thus, a white wax-like isocyanate-modified acrylic monomer was obtained.

Then, 60 g of the isocyanate-modified acrylic monomer was added to the solution of the acrylic polymer obtained as above, and they were reacted at 80° C. for 2 hours. After the reaction, toluene was removed by distillation under reduced pressure. When about half of toluene was removed, 200 g of butyl Cellosolve was added, and the remaining toluene and a part of butyl Cellosolve were removed to afford a solution of a water-soluble resin having an acid value of 100 and a solids content of 80%.

The resulting solution (100 g), 36 g of butyl Cellosolve, 166 g of n-butyl methacrylate and 59 g of nitro cellulose (PQ type SS ¼, a tradename for a product of Daicel Ltd.) wetted with 30% isopropyl alcohol were mixed to form a solution. To the solution were added 11 cc of 29% aqueous ammonia and 362 g of water, and the mixture was stirred. To the resulting aqueous dispersion was added a solution of 0.5 g of ammonium persulfate in 5 g of water, and the mixture was heated at 80° C. for 3 hours.

The properties of the resulting emulsion composition and a from film formed from it are shown in Table 1.

COMPARATIVE EXAMPLE 1

Example 1 was repeated except that n-butyl methacrylate was further added instead of the wet nitro cellulose used in Example 1.

The properties of the resulting emulsion and a film prepared from it are shown in Table 1.

COMPARATIVE EXAMPLE 2

A 2-liter four-necked flask was charged with 500 g of butyl Cellosolve and 130 g of acetone, and they were heated to 85° C. A mixture of 80 g of ethyl acrylate, 180 g of methyl methacrylate, 103 g of acrylic acid, 267 g of 2-ethylhexyl methacrylate and 32 g of azobisdimethylvaleronitrile was added dropwise over 2 hours. At the end of the addition, the temperature of the mixture reached 110° C. One hour and two hours respectively after the addition, 5.2 g of azobisisobutyronitrile was added. The mixture was heated at 110° C. for 2 hours.

After the reaction, acetone and a part of the butyl Cellosolve were removed by distillation under reduced pressure to afford a solution of a water-soluble resin having an acid value of 102 and a solids content of 69.2%.

The resin solution (231 g), 41 g of butyl Cellosolve, 331 g of n-butyl methacrylate and 118 g of the same wet nitro cellulose as used in Example 1 were mixed to form a solution. To the resulting solution were added 22 cc of 29% aqueous ammonia and 724 g of water, and the mixture was well stirred. To the resulting aqueous dispersion was added a solution of 1 g of ammonium peroxide in 10 g of water, and the mixture was heated at 80° C. for 3 hours.

The properties of the resulting emulsion composition and a film prepared from it are shown in Table 1.

COMPARATIVE EXAMPLE 3

Comparative Example 2 was repeated except that cellulose acetate butyrate (the same as that used in Example 2) was used instead of the wet nitro cellulose. The properties of the resulting emulsion composition and a film prepared from it are shown in Table 2.

COMPARATIVE EXAMPLE 4

Comparative Example 2 was repeated except that n-butyl methacrylate was further added instead of the wet nitro cellulose. The properties of the resulting emulsion composition and a film prepared from it are shown in Table 1.

TABLE 1

| | | Example 1 | Example 3 | Comparative Example 1 | Comparative Example 2 | Comparative Example 4 |
|---|---|---|---|---|---|---|
| Properties of the emulsion | Solids content (%) | 38.3 | 38.9 | 39.1 | 40.3 | 39.1 |
| | Transparency (mm) | 0.14 | 0.10 | 0 | 0 | 0 |
| | Condition (after 7 day standing) | ○ | ○ | ○ | Δ | X |
| | Viscosity (centipoises) | 54 | 60 | 54 | 820 | 170 |
| Properties of the coated film | Tackiness | ○+ | ○ | ○− | ○ | ○ |
| | Appearance by visual observation | ⊙ | ⊙ | ○ | X | Δ− |
| | Gloss | 106.5 | 110.0 | 82.4 | 13.1 | 11.7 |
| | Hardness (2 days after drying) | B | B | 3B | B | 2B |
| | Hardness (10 days after drying) | F | F | HB | HB | F |
| | Bending test | ⓐ | ⓐ | ○ | Δ | ○ |
| | Water resistance | ○ | ○− | ○ | ○ | ○ |
| | Gasoline resistance | ⓐ | ⓐ | X | ⓐ− | Δ |
| | Polishability | ⓐ | ⓐ | Δ | Δ | Δ |

TABLE 2

| | | Example 2 | Comparative Example 3 |
|---|---|---|---|
| Properties of the emulsion | Solids content (%) | 37.5 | 41.8 |
| | Transparency (mm) | 0.05 | 0 |
| | Condition (after 7 days standing) | ⓐ | Δ |
| | Viscosity (centipoises) | 46 | 820 |
| Properties of the coated film | Tackiness (Glass sheet) | ○ | ○ |
| | Appearance by visual observation | ○ | X |
| | Gloss | 76.9 | 2.7 |
| | Hardness (after 2 days drying) | B | B |
| | Hardness (after 10 days drying) | HB | B |
| | Bending test | ○− | Δ |
| | Polishability | ⓐ− | Δ |

The properties of the emulsion composition and the coated film shown in Tables 1 and 2 above and Tables 3 and 4 below were tested by the following methods.

Transparency

The thickness of an emulsion layer through which a 12-grade type closely adhering to a transparent glass plate can be read was determined.

Condition of the emulsion

The emulsion was observed visually to determine whether a precipitate formed.

Viscosity

Measured at 30 ppm using a Brookfield viscometer.

Tackiness

A test sample was placed horizontal in an indirect hot air furnace kept at 70° C. with the coated surface of the sample directed upwardly. Five sheets of gauze, 50 mm$^2$ in area, were stacked on the center of the coated surface. A weight having a diameter of 40 mm and weighing 500 g was placed on the center. After standing for 1 hour, the sample was taken out of the furnace, and the gauze was separated from the coated surface. The degree of sticking between the coated surface and the gauze and the trace of the woven texture of the gauzes were examined.

Gloss

The 20° mirror-surface reflection of a coated film on a glass plate was measured.

Hardness

The pencil hardness of a coated film on a surface-treated steel plate was measured 2 days and 10 days, respectively, after drying.

Bending test

A coated film on a surface-treated steel plate was bended by an angle of 180° C. by a bending tester having a rod with a diameter of 1 cm, and the bended state was observed.

Water resistance

Water was placed on the surface of a film coated on a surface-treated steel plate 10 days after drying, and a change in the coated film was observed 2 hours later.

Gasoline resistance

Gasoline was placed on the surface of a coated film on a glass plate ten days after drying, and was evaporated. The state of the surface of the coated film after evaporation of the gasoline was observed.

Polishability

The surface of a coated film was polished 10 times with a #400 water-resistant abrasive paper, and then the state of the abrasive paper was examined. The state in which the coated film does not stick to the abrasive paper is good.

The results of the tests were evaluated on a scale of five grades, ⊙, ○, ⓐ, Δ and X in which ⓐ to ⊙ show that the coated film is practical, and Δ and X show that the coated film is not practical.

EXAMPLE 4

A 2-liter four-necked flask was charged with 556 g of butyl Cellosolve, and it was heated to 60° to 70° C. A mixture of 77 g of ethyl acrylate, 173 g of methyl methacrylate, 90 g of acrylic acid, 211 g of 2-ethylhexyl methacrylate, 5 g of allyl methacrylate and 32 g of azobisdimethylvaleronitrile was added dropwise over 3 hours. One hour after the addition, 5 g of azobisdimethylvaleronitrile was added, and the mixture was left to stand at 60° C. for 2 hours to afford a solution of a water-soluble resin having an acid value of 118 and a solids content of 50.5%.

The resin solution (158 g), 166 g of n-butyl methacrylate and 59 g of nitrocellulose (wetted with 70% isopropyl alcohol) were mixed to form a solution. To the solution were added 11 cc of 29% aqueous ammonium and 340 g of water, and with stirring, a solution of 0.5 g of ammonium persulfate in 5 g of water was added. The mixture was heated at 80° C. for 3 hours.

The properties of the resulting emulsion composition and a film formed from it on a glass sheet or a surface-treated steel plate are shown in Table 3.

EXAMPLE 5

Example 4 was repeated except that cellulose acetate butyrate (CAB 381 0.1, a tradename for a product of Eastman Chemical Co.) was used. The properties of the resulting emulsion composition and a film formed from it are shown in Table 4.

EXAMPLE 6

The water-soluble resin solution (158 g) obtained in Example 4, 145 g of n-butyl methacrylate and 89 g of nitrocellulose (wetted with 30% of isopropyl alcohol) were mixed to form a solution. To the resulting solution were added 11 cc of 29% aqueous ammonia and 340 g of water, and the mixture was well stirred. To the resulting aqueous dispersion was added a solution of 0.5 g of ammonium persulfate in 5 g of water, and the mixture was heated at 80° C. for 3 hours.

The properties of the resulting emulsion composition and a film formed from it are shown in Table 3.

EXAMPLE 7

Butyl Cellosolve (556 g) was added to a 2-liter four-necked flask, and heated to 60° C. A mixture of 15 g of allyl methacrylate, 77 g of ethyl acrylate, 173 of methyl methacrylate, 90 g of acrylic acid, 201 g of 2-ethylhexyl methacrylate and 32 g of azobisdimethylvaleronitrile was added dropwise. From a separate feed opening, a mixture of 5 g of t-dodecylmercaptan and 50 g of butyl Cellosolve was added dropwise simultaneously over 3 hours. One hour after the addition, 5 g of azobisdimethylvaleronitrile was added, and the mixture was left to stand for 2 hours to afford a solution of a water-soluble resin having an acid value of 130 and a solids content of 48.4%.

The resin solution (165 g), 59 g of nitrocellulose (wetted with 30% isopropyl alcohol) and 166 g of n-butyl methacrylate were mixed to form a solution. To the resulting solution were added 12 cc of 29% aqueous ammonia and 340 g of water, and the mixture was well stirred. To the resulting aqueous dispersion was added a solution of 0.5 g of ammonium persulfate in 5 g of water, the mixture was heated at 80° C. for 3 hours.

The properties of the resulting emulsion composition and a film formed from it are shown in Table 3.

EXAMPLE 8

A water-soluble resin solution was obtained by the same method as in Example 7 except that i-butyl methacrylate was used instead of 250 g of ethyl acrylate and methyl methacrylate combined. The water-soluble resin solution had an acid value of 129 and a solids content of 48.0%.

The resin solution (165 g), 42 g of cellulose acetate butyrate (CAB 551 0.2, a tradename for a product of Eastman Chemical Co.) and 166 g of n-butyl methacrylate were mixed to form a solution. To the solution were added 11 cc of 29% aqueous ammonia and 340 g of water, and with good stirring, a solution of 0.5 g of ammonium persulfate in 5 g of water was added. The mixture was heated at 80° C. for 3 hours.

The properties of the resulting emulsion composition and a film formed from it are shown in Table 4.

EXAMPLE 9

A water-soluble resin solution was prepared by the same method as in Example 7 except that an adduct of allyl glycidyl ether and acrylic acid was used instead of 15 g of the allyl methacrylate. The resulting solution of water-soluble resin had an acid value of 130 and a solids content of 48.1%.

Using the resulting resin solution, an emulsion composition containing a cellulose derivative was prepared by the same method as in Example 7.

The properties of the resulting emulsion composition and a film formed from it are shown in Table 3.

COMPARATIVE EXAMPLE 5

An emulsion composition was prepared by the same method as in Example 4 except that n-butyl methacrylate was further added instead of nitrocellulose.

The properties of the emulsion composition and a film formed form it are shown in Table 3.

COMPARATIVE EXAMPLE 6

Butyl Cellosolve (556 g) was added to a 2-liter four-necked flask, and heated to 60° to 70° C. A mixture of 77 g of ethyl acrylate, 173 g of methyl methacrylate, 90 g of acrylic acid, 216 g of 2-ethylhexyl methacrylate and 32 g of azobisdimethylvaleronitrile was added dropwise over 3 hours. One hour after the addition, 5 g of azobisdimethylvaleronitrile was further added, and the mixture was left to stand for 2 hours to afford a solution of a water-soluble resin having an acid value of 124 and a solids content of 50.3%.

The resin solution (158 g), 166 g of n-butyl methacrylate and 59 g of nitrocellulose (wetted with 30% isopropyl alcohol), were mixed to form a solution. To the solution were added 11 cc of 29% aqueous ammonia and 340 g of water, and the mixture was stirred. A solution of 0.5 g of ammonium persulfate in 5 g of water was added to the aqueous dispersion, and the mixture was heated to 80° C. for 3 hours.

The properties of the resulting emulsion composition and of a film formed from it are shown in Table 3.

COMPARATIVE EXAMPLE 7

Comparative Example 6 was repeated except that n-butyl methacrylate was further added instead of nitrocellulose.

The properties of the resulting emulsion composition and of a film formed from it are shown in Table 3.

COMPARATIVE EXAMPLE 8

Comparative Example 6 was repeated except that cellulose acetate butyrate (the same as that used in Example 5) was used instead of the nitrocellulose.

The properties of the resulting emulsion composition and of a film formed from it are shown in Table 4.

TABLE 3

| | | Example | | | | Comparative Example | | |
|---|---|---|---|---|---|---|---|---|
| | | 4 | 6 | 7 | 9 | 5 | 6 | 7 |
| Properties of the emulsion | Solids content (%) | 38.8 | 37.6 | 38.0 | 38.5 | 39.7 | 38.3 | 38.6 |
| | Transparency (mm) | 0.09 | 0.19 | 0.47 | 0.28 | 0 | 0 | 0 |
| | Condition (after 7 days standing) | ⊙ | ⊙ | ⊙ | ⊙ | ○ | ○ | X |
| | Viscosity (centipoises) | 720 | 250 | 6800 | 5300 | 260 | 250 | 600 |
| Properties of the coated film | Tackiness | ⊙ | ⊙ | ⊙ | ⊙ | ○ | ○ | ⊙ |
| | Appearance observed visually | ⊙ | ⊙ | ⊙ | ⊙ | ○ | △ | △ |
| | Gloss | 121 | 119 | 133 | 134 | 100 | 30 | 51 |
| | Hardness (after 2 days drying) | HB | F | H | H | HB | F | B |
| | Hardness (after 10 days drying) | H | H | H | H | F | F | HB |
| | Bending test | △ | △ | △ | △ | △ | △ | △ |
| | Water resistance | ⊙ | ⊙ | ⊙ | ⊙ | ○ | ○ | △ |
| | Gasoline resistance | ○− | ○ | △ | △ | X | △ | X |
| | Polishability | △ | ○− | △+ | △ | △ | △+ | △ |

TABLE 4

| | | Example 5 | Example 8 | Comparative Example 8 |
|---|---|---|---|---|
| Properties of the emulsion | Solids content (%) | 38.7 | 38.5 | 38.8 |
| | Transparency (mm) | 0 | 0 | 0 |
| | Condition (after 7 days standing) | △ | ○ | △ |
| | Viscosity (centipoises) | 350 | 3240 | 250 |
| Properties of the coated film | Tackiness | ○ | ○ | △ |
| | Appearance observed visually | △ | △ | △ |
| | Gloss | 60 | 58.4 | 34 |
| | Hardness (after 2 days drying) | HB | HB | 3B |
| | Hardness (after 10 days drying) | HB | F | HB |
| | Bending test | △ | △ | △ |
| | Water resistance | ○ | ○ | ○ |
| | Water resistance (spot) | △ | ○ | △ |
| | Gasoline | | | |

TABLE 4-continued

| | Example 5 | Example 8 | Comparative Example 8 |
|---|---|---|---|
| resistance | ⓐ — | △ | X |
| Polishability | ⓐ — | ⓐ | △ |

What is claimed is:

1. An emulsion composition which is the product of emulsion polymerization of a mixture of (A) at least one radical-polymerizable unsaturated monomer selected from the group consisting of vinyl aromatic compounds and acrylic and methacrylic acid esters and (B) at least one cellulose derivative having a number average moleculare weight of about 3,000 to about 200,000 and selected from ester-modified cellulose derivatives with an average degree of esterification of 15 to 70% and ether-modified cellulose derivatives with an average degree of etherification of 30 to 70%, in the presence of a water-soluble resin containing a graft-polymerizable unsaturated group in the side chain and having an acid value of 10 to 350 and a number average molecular weight of about 500 to about 100,000, said water-soluble resin being selected from the group consisting of:
  (a) water-soluble resins obtained by the addition reaction of a carboxyl-containing vinyl polymer with a glycidyl containing vinyl monomer,
  (b) water-soluble resins obtained by the addition reaction of a vinyl polymer containing both a carboxyl group and a hydroxyl group with vinyl isocyanate or a mono-addition product of a diisocyanate compound and a hydroxyl-containing acrylic monomer, and
  (c) copolymers of
    (i) a monomer containing one radical-polymerizable unsaturated group represented by the following formula $$CH_2=C\begin{matrix}R_4\\R_5\end{matrix}$$

wherein $R_4$ represents a hydrogen atom or a methyl group, $R_5$ represents $$-\underset{\underset{O}{\|}}{C}-C-,\ -\underset{\underset{O}{\|}}{C}-\underset{\underset{R_6}{|}}{N}-,$$

a phenylene group or a lower alkylene group, and $R_6$ represents a hydrogen atom or a methyl or ethyl group,
    and at least one graft-polymerizable unsaturated group,
    (ii) an $\alpha,\beta$-ethylenically unsaturated acid, and/or a monoester of a polyalkylene glycol and acrylic or methacrylic acid, and
    (iii) another radical-polymerizable unsaturated monomer.

2. The composition of claim 1 wherein the carboxyl-containing vinyl polymer is a copolymer of an $\alpha,\beta$-ethylenically unsaturated carboxylic acid and a radical-polymerizable unsaturated monomer.

3. The composition of claim 1 wherein the carboxyl-containing vinyl polymer has a number average molecular weight of about 300 to about 100,000 and an acid value of 10 to 300.

4. The composition of claim 1 wherein the glycidyl-containing vinyl monomer is glycidyl arcylate, glycidyl methacrylate or allyl glycidyl ether.

5. The composition of claim 1 wherein the proportion of the glycidyl-containing vinyl monomer in the first-mentioned water-soluble resin is 0.1 to 30% by weight based on the total weight of the carboxyl-containing vinyl polymer and the glycidyl-containing vinyl monomer.

6. The composition of claim 1 wherein the vinyl polymer containing both a carboxyl group and a hydroxyl group has an acid value of 10 to 300, a hydroxyl value of 2 to 150 and a number average molecular weight of about 300 to about 100,000.

7. The composition of claim 1 wherein the proportion of vinyl isocyanate or the mono-addition product in the second-mentioned water-soluble resin is 0.1 to 30% by weight based on the total weight of the vinyl polymer and the vinyl diisocyanate or the mono-addition product.

8. The composition of claim 1 wherein the radical-polymerizable unsaturated group in the monomer (i) is $CH_2=CHCOO-$ or $CH_2=C(CH_3)COO-$.

9. The composition of claim 1 wherein the graft-polymerizable unsaturated group in the monomer (i) is $CH_2=CH-CH_2-O-$ or $$CH_2=CH-CH\begin{matrix}O-\\O-\end{matrix}$$

10. The composition of claim 1 wherein the $\alpha,\beta$-ethylenically unsaturated acid (ii) is an aliphatic unsaturated mono- or di-carboxylic acid having 3 to 22 carbon atoms, an anhydride or monoester of said dicarboxylic acid, or a vinyl aromatic mono- or di-sulfonic acid having 8 to 12 carbon atoms.

11. The composition of claim 1 wherein said monoester between the polyalkylene glycol and acrylic or methacrylic acid is a product obtained by esterification of one OH of polyethylene glycol or polypropylene glycol having a molecular weight of 40 to 500 with acrylic or methacrylic acid.

12. The composition of claim 1 wherein the other radical-polymerizable unsaturated monomer (iii) is an ethylenically unsaturated monomer having a Q value, in the Q-e theory, of at least 0.1.

13. The composition of claim 1 wherein the copolymer is composed of 0.1 to 30% by weight of the monomer (i), 2 to 60% by weight of the $\alpha,\beta$-ethylenically unsaturated acid or 10 to 80% by weight of the monoester as the omonomer (ii), and 10 to 97.9% by weight of the monomer (iii).

14. The composition of claim 1 wherein the ester-modified type cellulose derivative has an average degree of esterification of 20 to 60%.

15. The composition of claim 1 wherein the ether-modified type cellulose derivative has an average degree of etherification of 35 to 60%.

16. The composition of claim 1 wherein the cellulose derivative is nitrocellulose or cellulose acetate butyrate.

17. The composition of claim 1 wherein the proportion of the water-soluble resin is 2 to 90% by weight based on the total solids content in the resulting emulsion.

18. The composition of claim 1 wherein the proportion of the cellulose derivative is 3 to 97% by weight based on the balance of the total solids content of the emulsion from which the solids content of the water-soluble resin has been substracted.

19. A coating composition comprising the aqueous emulsion composition of claim 1 as a film-forming component.

20. The composition of claim 1 wherein the vinyl aromatic compound of (A) is selected from the group consisting of styrene, α-methylstyrene, vinyltoluene and vinylpyridine.

21. The composition of claim 1 wherein the acrylic or methacrylic acid ester is selected from the group consisting of $C_{1-20}$ alkyl and cycloalkyl esters of acrylic or methacrylic acid; alkoxyalkyl esters of acrylic or methacrylic acid; $C_{2-8}$ hydroxyalkyl esters of acrylic or methacrylic acid; mono-esters between acrylic or methacrylic acid and polyalkylene glycols; and adducts between glycidyl acrylate or glycidyl methacrylate and $C_{2-20}$ monocarboxylic acid compounds.

22. The composition of claim 1 wherein the ester-modified cellulose derivative is selected from the group consisting of nitrocellulose, cellulose acetate butyrate, cellulose acetate propionate, cellulose acetate phthalate, cellulose acetate, cellulose propionate, cellulose butyrate, cellulose phosphate, and cellulose sulfate.

23. The composition of claim 1 wherein the ether-modified cellulose derivative is selected from the group consisting of methyl cellulose, ethyl cellulose, butyl cellulose, benzyl cellulose, carboxy methyl cellulose, carboxy ethyl cellulose, aminoethyl cellulose, hydroxyethyl cellulose, oxyethyl cellulose, hydroxypropyl cellulose, and hydroxypropyl methyl cellulose.

* * * * *